United States Patent

[11] 3,629,715

| [72] | Inventors | Benjamin W. Brown<br>Nashua;<br>James A. Valentino, Salem, both of N.H. |
|---|---|---|
| [21] | Appl. No. | 866,550 |
| [22] | Filed | Oct. 15, 1969 |
| [45] | Patented | Dec. 21, 1971 |
| [73] | Assignee | Sanders Associates Inc.<br>Nashua, N.H. |

[54] DIGITAL PHASE SYNTHESIZER
11 Claims, 2 Drawing Figs.

[52] U.S. Cl. ........................................... 328/155,
328/48, 328/105, 328/55
[51] Int. Cl. ............................................. H03b 3/04
[50] Field of Search ............................................ 324/88 A,
88 D; 328/27, 105, 155, 48, 55

[56] References Cited
UNITED STATES PATENTS

| 2,923,820 | 2/1960 | Ligvori et al. ................. | 328/155 |
| 2,983,872 | 5/1961 | Williamson et al. .......... | 328/27 |
| 3,229,203 | 1/1966 | Minohara ...................... | 324/83 |
| 3,349,257 | 10/1967 | Thomas et al. ................ | 328/27 X |
| 3,500,214 | 3/1970 | Broadhead et al. ........... | 328/155 X |

*Primary Examiner*—John S. Heyman
*Attorney*—Louis Etlinger

ABSTRACT: A method and apparatus for generating two series of repetitive signals having the same selectable repetition frequency but differing in phase by a precisely selectable amount in which repetitive signals are generated and then counted simultaneously in two series starting with different preselected initial counts and in which first and second output signals are generated each time each count reaches a predetermined count and integral multiples thereof.

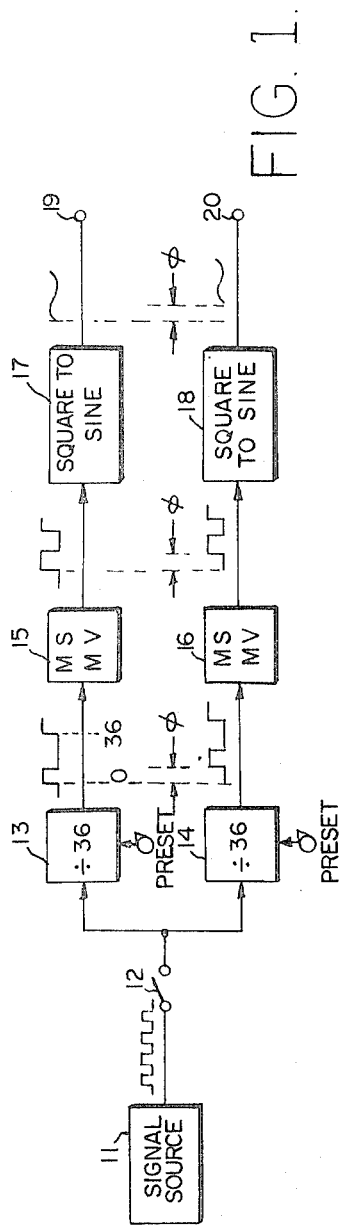
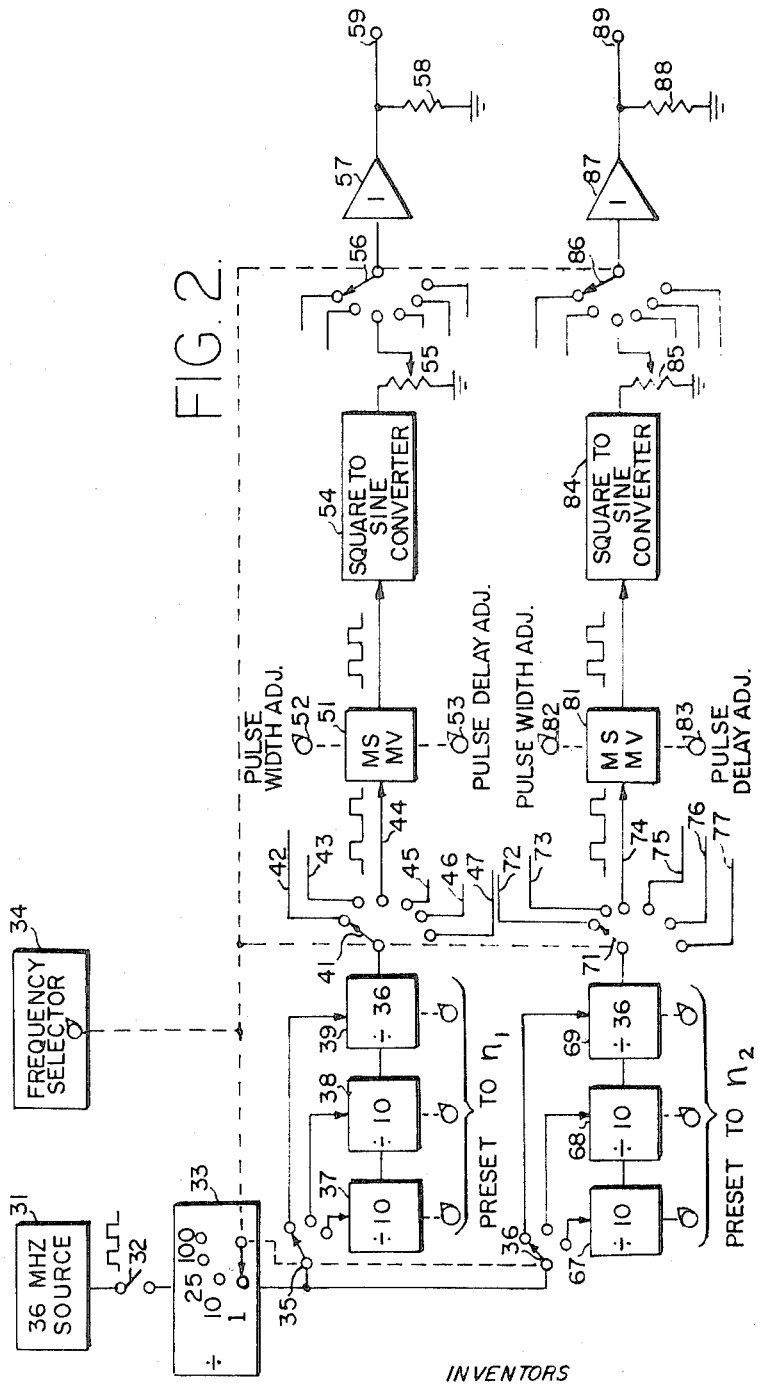

DIGITAL PHASE SYNTHESIZER

FIELD OF THE INVENTION

This invention relates generally to methods and apparatus useful for calibrating phase meters and more particularly to methods and apparatus for generating two alternating voltages having a selectable phase relationship.

BACKGROUND

Phase meters are very useful instruments which measure the phase angle between two alternating voltages of the same frequency. Several different models are commercially available and one or more of these may be found in most electronic laboratories and factories. Like other instruments, they require calibration from time to time. The instrument used to calibrate them should, of course, have an accuracy far in excess of the accuracy of the meter being calibrated.

In the past, phase meters have been calibrated in a number of ways. In one arrangement, two alternating voltages are applied simultaneously to the instrument under test and to a time interval meter. The latter measures the time elapsing between corresponding points on the two voltage waveforms. From this time measurement, the phase angle can be calculated provided the frequency of the two voltages is known with sufficient accuracy. Another way of calibrating phase meters is to use a precision calibrated phase shifter. In this case, the accuracy of the calibration depends upon the accuracy of the phase shifter, and its use is usually limited to a single frequency. In yet another method, the accuracy of the calibration is dependent upon the accuracy with which one can measure and compare the level of two alternating voltages. All of these prior arrangements leave something to be desired.

It is a general object of the present invention to provide an improved method and apparatus suitable for use in calibrating phase meters.

Another object is to provide a method and apparatus suitable for calibrating phase meters in which the accuracy of calibration does not depend upon the precision with which one knows the frequency of the voltages being used.

A more specific object of the invention is to provide an improved method and apparatus for generating two series of repetitive signals having the same frequency but differing in phase by a precisely selectable amount.

Summary of the Invention

In accordance with the invention, a series of repetitive signals having a predetermined frequency is generated. These signals are counted twice simultaneously in two separate series. However, each series of counts starts initially with a different count so that the accumulated total in each series at any one time is different. An output signal is generated for each series each time the accumulated total of that series reaches a predetermined count and each time it reaches an integral multiple thereof. Thus, two series of output signals are generated having the same repetition frequency but differing in phase by an amount dependent upon the preselected initial counts.

DESCRIPTION OF THE DRAWING

For a clearer understanding of the invention, reference may be made to the following detailed description and the accompanying drawing in which:

FIG. 1 is a schematic block diagram of a simplified form of the invention; and

FIG. 2 is a schematic block diagram of a preferred embodiment of the invention.

DESCRIPTION OF PREFERRED EMBODIMENTS

Referring first to FIG. 1, there is shown a signal source 11 which generates a series of periodic signals having a substantially constant predetermined frequency. The signals are preferably converted to, or generated in the first instance as, a series of substantially rectangular pulses. These pulses are connected through a switch 12 to two counters 13 and 14. These counters may be thought of as frequency dividers which generate output voltages whose frequency is a submultiple of the input voltages. However, it is more convenient for present purposes to think of the two devices as counters. These counters may each be an assembly of J-K flip-flops connected in a well-known manner, so as to generate one output signal each time the accumulated count equals a predetermined amount. In the illustrative example, this amount is 36. That is, each time the total count accumulated in each of the counters reaches 36, the output changes state, for example, going from a low level to a high level. Such output signals are generated at every integral multiple of the predetermined count, in this example, when the count reaches 36, 72, 108, etc. This is conveniently accomplished by connecting the flip-flops so as to have 36 separate states designated as states zero to 35 inclusive and arranged to respond to input pulses by progressing from state zero up to state 35 and then repeating so that the 36th input pulse returns the counter to state zero and generates an output signal. Each of the counters 13 and 14 is so constructed that it can be present to any of its 36 states from zero to 35 inclusive. The details of the connections of counters as above described are well known to those skilled in the art and accordingly have not been set out in detail herein.

Let it be assumed that with the switch 12 open, the counters 13 and 14 are preset to different states, for example, zero for counter 13 and 30 for counter 14. Let it further be assumed that the counters are so connected that when in the zero state the output is at a high voltage level. Referring first to counter 13, the voltage will remain high until a number of pulses less than 36 have been counted, whereupon the output will be low. The count at which the voltage level drops from high to low is not important. However, when the number of input pulses reaches 36, the counter will be returned to the zero state, the level will be switched from low to high and the process will be repeated. Turning to the counter 14, it is already started with state 30 so that after the receipt of only six pulses the counter will return to the zero state and the voltage level will go from low to high. Then, after 36 more pulses, the voltage will go again from low to high. In the case of both counters, the change in level from low to high is regarded as the output signal. In each case, an output signal occurs for each 36 pulses. However, the output signals from counter 14 occur 30 pulses sooner than those for counter 13 or, what is equivalent, they occur six pulses later. Since 36 input pulses represent one complete cycle of both series of repetitive output signals, each pulse represents one thirty-sixth of a cycle or 10° and accordingly six pulses represent 60°. Therefore, the outputs of the counters 13 and 14 are two series of repetitive signals having the same frequency but which differ in phase by 60°.

The outputs of the two counters do not, in general, form symmetrical waves but this is unimportant since it is only the transitions from a low level to a high level which are of interest for present purposes. (Of course, the apparatus could be constructed equally as well to use transitions from a high level to a low level). In order to make the waveforms symmetrical, the counters 13 and 14 are connected to monostable multivibrators 15 and 16 respectively. The positive going portion of each waveform triggers the multivibrators which are adjusted to produce substantially square wave outputs. In many cases, it is useful to have sine wave outputs and accordingly the multivibrators 15 and 16 are connected to square to sine wave converters 17 and 18 respectively. Each of these converters may, for example, comprise an amplifier with capacitive feedback to round off the corners of the square wave followed by a band-pass filter of the appropriate frequency. However, such converters are well known to those skilled in the art and therefore have not been illustrated in detail. The converters 17 and 18 are connected to output terminals 19 and 20.

In operation, the source 11 is disconnected by opening the switch 12. Selection of the desired phase relationship between the voltages on output terminals 19 and 20 is made by suitably selecting the initial counts of the counters 13 and 14. Regarding the voltage of terminal 19 as the reference, or zero phase, voltage, the phase of the voltage on terminal 20 may be selected to have any value from zero to 360°, in increments of 10°. For example, if it is desired that the voltage of terminal 20 lead the voltage of terminal 19 by 60°, the two preselected counts must differ by six. The counter 13 may be set to an initial count of zero and that of counter 14 at six. The same result could be obtained by setting the counter 13 to two and the counter 14 to eight. The importance of these settings is the difference between the counts.

In the embodiment of FIG. 1, the output voltages at terminals 19 and 20 have the same frequency which is one thirty-sixth of that of the signal source 11. As explained above, the phase difference between the output signals may be any of 36 preselected values which may be selected in increments of 10°. Variations in frequency of the source 11 do not affect the phase difference at the outputs of the counters 13 and 14 because reactive components are not relied upon to obtain phase difference. Phase difference is obtained by counting signals which in this case are cycles of the source 11. Phase differences in the sine wave outputs caused by the reactive components in the multivibrators and in the square to sine wave converters may be eliminated by adjusting the multivibrators, as will be more fully discussed in connection with FIG. 2.

Referring now to FIG. 2, there is shown a preferred embodiment of the invention. A source of repetitive signals 31, for example, an oscillator for generating square waves at a frequency of 36 MHz. is connected through a switch 32 to a frequency dividing circuit 33. This circuit may be selectively connected to divide the incoming frequency by one, by 10, by 25 or by 100. Selection is made by means of a frequency selecting circuit 34. The dividing circuit 33 preferably comprises an arrangement of J-K flip-flops arranged to generate a level transition (for example, from low to high) for each such input change, for each 10 such input changes, for each 25 such input changes or for each 100 such input changes. The output of the circuit 33 is led to switches 35 and 36. The switch 35 leads the signal to a group of frequency dividers, or counters 37, 38 and 39 which operate to divide the input frequency by 10, by 10, and by 36 respectively. These dividers may also be thought of as counters having capacities of 10, 10 and 36 respectively and preferably are each an arrangement of J-K flip-flops, each capable of being present to any whole number of counts, including zero, which is less than the total capacity of that counter. The switch 35 selects whether the output of the dividing circuit 33 will be divided by 36, by 360 or by 3,600. In the preferred embodiment being described, by suitably adjusting switch 35 and the circuit 33, output frequencies of 100 Hz., 400 Hz., 1 kHz., 10 kHz., 100 kHz. and 1 MHz. are obtainable.

The output of the counter 39 is led to a switch 41 which is also controlled by the frequency selecting circuit 34 so as to put the output of the counter 39 on one of six output lines 42 to 47 inclusive, each representing a different one of the aforesaid output frequencies. The line 44 is led to the input of a monostable multivibrator circuit 51 which accepts the unsymmetrical rectangular wave output of the counter 39 and generates a substantially square wave output. The multivibrator 51 preferably is provided with means 52 for adjusting the pulse width so as to make the output substantially a square wave. It is also provided with means 53 to delay the pulse and adjustable amount. Both of these adjustments are for purposes which will appear subsequently. The output of the circuit 51 is led to a circuit 54 which changes the square wave to a sine wave output. This output is applied to a potentiometer 55 by means of which the amplitude of the output may be adjusted.

Each of the lines 42, 43, 45, 46 and 47 is provided with a multivibrator, a square to sine wave converter, and a potentiometer similar to the units 51, 54 and 55 just described for the line 44. The output of each of the potentiometers, such as 55, is led to a terminal of a six position switch 56 which is also operated by the frequency selector 34. The common arm of the switch 56 is led to the input of a unity gain amplifier 57, the output of which appears across a resistor 58 and is available on a terminal 59.

The switch 36 is connected to a similar chain of components including the divider circuits 67, 68 and 69, switch 71, lines 72-77 inclusive, monostable multivibrator 81, square to sine wave converter 84, a potentiometer 85, a switch 86, a unit gain amplifier 87, a resistor 88 and a terminal 89. The switches 71 and 86 are also operated by the frequency selector 34.

Before using the apparatus of FIG. 2, the pulse widths of the multivibrators 51 and 81 are set by means of the adjusters 52 and 82 to produce a square wave output. Then the potentiometers 55 and 85 are adjusted to make the voltages on terminals 59 and 89 equal. Since the multivibrators 52, 81 and the square to sine wave converters 54, 84 may introduce different amounts of time delay, the pulse delay adjusters 53 and 83 are provided to compensate for this delay. Adjustment may be made conveniently by setting the phase difference to 180°, adding the output voltages on terminals 59 and 89, reading the sum on a millivoltmeter, and varying one or both adjusters 53 and 83 for a minimum sum.

Let us consider an example. Let us suppose that it is desired that the output frequency be 1 kHz. The frequency selecting circuit 34 would be adjusted so as to put each of the counters 37, 38 and 39 and also each of the counters 67, 68 and 69 into the circuit thereby in each case establishing a division by 3,600. In addition, the dividing circuit 33 would be adjusted to divide by 10. Thus, the input frequency from the source 31 would be divided by 36,000 giving an output frequency of 1 kHz. The switches 41, 56, 71 and 86 would also be selected to connect the appropriate one of lines 42-47 and lines 72-77 in the circuit.

Let us further suppose that it is desired to have the output voltage at terminal 89 lead the output voltage on terminal 59 by 24.8°. Then, with the switch 32 open, the counters 37, 38, and 39 could be preset to zero while the counters 67, 68 and 69 could be preset to 248. Then each level change at the output of the counter 69 would occur 248 pulses sooner than it occurs at the output of counter 39. Since each pulse represents one tenth of a degree the phase shift would be 24.8°. The same result could be obtained by presetting counters 37, 38 and 39 to 200 and by setting the counters 67, 68 and 69 to 448. The importance of these settings is that the difference in the preselected counts of the two chains of counters determines the phase shift.

It will be understood that the showing of FIG. 2 is highly schematic and that the various switching functions are preferably accomplished with solid state logic circuits, all as well known to those skilled in the art.

From the above it will be apparent that the present invention provides a method and apparatus for generating two signals both having the same frequency which may be selected from among six possible frequencies. Additionally, the phase of one signal with respect to the other may be adjusted precisely. In the case of 1 MHz. output, increments of 10° are obtainable; for outputs of 100 kHz., increments of 1° are obtainable; while for outputs of 10 kHz. 1 kHz., 400 Hz. and 100 Hz. increments of one tenth of a degree are obtainable. These, of course, are merely illustrative and represent a preferred embodiment designed and built for a specific purpose.

What is claimed is:

1. The method of generating two series of repetitive signals from a single source of signals having a predetermined repetition frequency, said two series of signals having the same repetition frequency, but differing in phase by a predetermined amount, comprising the steps of first, disconnecting said source, second, providing two counters each capable of registering up to a selectable predetermined number of discrete signals applied thereto, third, presetting each of said counters to register a different initial count, fourth, adjusting each counter to generate an output signal as each registers the same total end count, and fifth, reconnecting said source, whereby two series of output signals are generated having the same frequency but differing in phase by an amount determined by the difference between the aforesaid initial counts.

2. The method of generating two series of repetitive signals having the same repetition frequency but differing in phase by a predetermined amount, comprising the steps of providing two counters each capable of registering up to a selectable predetermined number of discrete signals applied thereto, presetting each of said counters to register a different initial count, adjusting each counter to generate an output signal as each registers the same total end count, generating a series of signals having a predetermined repetition frequency, and applying said series of signals to both of said counters, whereby two series of output signals are generated having the same frequency but differing in phase by an amount determined by the difference between the aforesaid initial counts.

3. Apparatus for generating two series of repetitive signals having the same frequency but differing in phase by a preselected amount, comprising first and second counters each for counting pulses applied thereto, each having the same capacity, and each for generating an output signal and restarting the count when its capacity is reached, each of said counters including means independent of the other for presetting therein any initial count within its capacity, and a source of pulses having a predetermined repetition frequency connected to both of said counters, whereby the output signals generated by said counters differ in phase by an amount determined by the difference between the initial counts preset therein.

4. Apparatus for generating two series of repetitive signals in accordance with claim 3 in which each of said counters comprises a plurality of subcounters and means for selectively connecting for operation all or less than all of said subcounters, whereby various output frequencies can be selected.

5. Apparatus for generating two series of repetitive signals in accordance with claim 4 which includes means for dividing the frequency of the signals from said source by a selected one of a plurality of integral divisors and for applying the resulting signals to said counters, whereby additional output frequencies are available.

6. Apparatus for generating two series of repetitive signals in accordance with claim 5 in which the output of each of said counters is selectively connectable to any one of a plurality of wave-shaping circuits equal in number to the number of frequencies available.

7. Apparatus for generating two series of repetitive signals in accordance with claim 3 in which the output signals from each of said counters is connected to a monostable multivibrator for generating a voltage having a substantially symmetrical rectangular waveform and in which each of said multivibrators is provided with means to delay the input by an adjustable amount.

8. Apparatus for generating two series of repetitive signals in accordance with claim 7 including means responsive to the output of each of said multivibrators for generating voltages having substantially sinusoidal waveforms.

9. Apparatus for generating two output voltages having any one of a plurality of predetermined frequencies and differing in phase by any of a plurality of preselected amounts, comprising, a source of repetitive signals having a predetermined frequency, dividing means connected to said source for dividing the frequency of said signals by any selected one of a plurality of integral divisors, and first and second signal-processing channels connected to said dividing means, said channels including first and second counting means respectively, each for counting input signals applied thereto and for generating an output signal as the count reaches a predetermined count, each of said counting means including means for selecting said predetermined count, and each of said counting means also including means for inserting a preselected initial count, each of said signal-processing channels including a plurality of subchannels equal in number to the number of frequencies available and selectively connectable to the outputs of said counting means, each of said subchannels including a monostable multivibrator responsible to the output of its associated counting means for generating a voltage having a substantially rectangular waveform, each of said multivibrators including means for adjusting the width of the pulses generated thereby, whereby the waveform may be adjusted to be substantially symmetrical, and each of said multivibrators also including means for delaying the input by a selectable amount, whereby transmission time delays in said signal processing channels may be equalized.

10. Apparatus for generating two output voltages in accordance with claim 9 in which each of said subchannels includes means responsive to the output of its multivibrator for deriving a voltage having a substantially sinusoidal waveform.

11. Apparatus for generating two output voltages in accordance with claim 10 in which each of said signal-processing channels includes a unity gain amplifier the input of which is selectively connectable to the output of one of the aforesaid subchannels of its associated processing channel.

* * * * *